(12) United States Patent
Hsiao et al.

(10) Patent No.: US 12,032,505 B2
(45) Date of Patent: Jul. 9, 2024

(54) COMMAND TRANSFORMING SYSTEM AND COMMAND TRANSFORMING METHOD

(71) Applicant: Realtek Semiconductor Corp., HsinChu (TW)

(72) Inventors: Cheng-Yuan Hsiao, HsinChu (TW); Sung-Kao Liu, HsinChu (TW); Yi-Cheng Tsai, HsinChu (TW); Chi-Rung Wu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 163 days.

(21) Appl. No.: 17/678,047

(22) Filed: Feb. 23, 2022

(65) Prior Publication Data

US 2023/0153262 A1 May 18, 2023

(30) Foreign Application Priority Data

Nov. 17, 2021 (TW) ................................ 110142731

(51) Int. Cl.
*G06F 13/42* (2006.01)
*G06F 13/10* (2006.01)

(52) U.S. Cl.
CPC ............ *G06F 13/42* (2013.01); *G06F 13/102* (2013.01)

(58) Field of Classification Search
CPC ................................. G06F 13/42; G06F 13/102
See application file for complete search history.

(56) References Cited

U.S. PATENT DOCUMENTS

| | | | | |
|---|---|---|---|---|
| 2002/0083216 A1* | 6/2002 | Hickson | ............... | G06F 9/45512 719/319 |
| 2014/0040525 A1* | 2/2014 | Ulenas | ................ | G06F 13/4022 710/313 |
| 2018/0039554 A1* | 2/2018 | Wang | ..................... | G11C 29/56 |
| 2018/0039595 A1* | 2/2018 | Kao | ........................ | G06F 13/385 |
| 2019/0327093 A1* | 10/2019 | Habraken | ............... | G06F 21/77 |
| 2020/0379833 A1 | 12/2020 | Hsiao | | |
| 2021/0133140 A1* | 5/2021 | Jeansonne | ........... | G06F 13/4282 |
| 2021/0173441 A1* | 6/2021 | Tang | ..................... | H05K 7/1417 |
| 2022/0012140 A1* | 1/2022 | Das Sharma | ....... | G06F 11/1471 |

FOREIGN PATENT DOCUMENTS

| TW | 201514702 A | 4/2015 |
|---|---|---|
| TW | 202046123 A | 12/2020 |
| TW | I722447 | 3/2021 |

* cited by examiner

*Primary Examiner* — Farley Abad
(74) *Attorney, Agent, or Firm* — Winston Hsu

(57) ABSTRACT

A command transforming method, applied to a command transforming system comprising a first transceiving interface and a second transceiving interface, comprising: receiving at least one command transmitted from a first device via the first transceiving interface; determining a first sequence rule of the first device and a second sequence rule of a second device, wherein the first sequence rule means if the first device is required to process the command in sequence and the second sequence rule means if the second device is required to process the command in sequence; transmitting the command to the second device via the second transceiving interface; processing the command by the second device according to the second sequence rule and transmitting a response corresponding to the command to the second transceiving interface by the second device; and transmitting the response to the first device according to the first sequence rule.

18 Claims, 6 Drawing Sheets

COMMAND TRANSFORMING SYSTEM AND COMMAND TRANSFORMING METHOD

BACKGROUND OF THE INVENTION

1. Field of the Invention

The present invention relates to a command transforming system and a command transforming method, and particularly relates to a command transforming system and a command transforming method which can control command transforming according to sequence requirements.

2. Description of the Prior Art

With the development of electronic technology, the transceiving interfaces have become more and more diverse, and the speed thereof become faster and faster. Therefore, the technology of high-speed transceiving interface switching is often used. For example, USB (Universal Serial Bus) to PCIE (peripheral component interconnect express), USB to SATA (Serial Advanced Technology Attachment) and the like.

In order to ensure these high-speed transceiving interfaces to transmit commands smoothly, a command transforming system which is compatible with two different transceiving interfaces is established. However, different high-speed transceiving interfaces have different characteristics or follow different standards. Some high-speed transceiving interfaces need to process commands in sequence, while others don't. Therefore, how the command transforming system can ensure the commands are smoothly received and executed while meeting the command execution sequence requirements of different transceiving interfaces becomes an important consideration.

SUMMARY OF THE INVENTION

One objective of the present invention is to provide a command transforming method which can meet the command execution sequence requirements of different transceiving interfaces.

Another objective of the present invention is to provide a command transforming system which can meet the command execution sequence requirements of different transceiving interfaces.

One embodiment of the present invention discloses a command transforming method, applied to a command transforming system comprising a first transceiving interface and a second transceiving interface, comprising: receiving at least one command transmitted from a first device via the first transceiving interface; determining a first sequence rule of the first device and a second sequence rule of a second device, wherein the first sequence rule means if the first device is required to process the command in sequence and the second sequence rule means if the second device is required to process the command in sequence; transmitting the command to the second device via the second transceiving interface; processing the command by the second device according to the second sequence rule and transmitting a response corresponding to the command to the second transceiving interface by the second device; and transmitting the response to the first device according to the first sequence rule.

Another embodiment of the present invention discloses a command transforming system, comprising: a first transceiving interface, configured to receive at least one command transmitted from a first device; a second transceiving interface, configured to transmit the command to the second device; and a controller, configured to control the first transceiving interface and the second transceiving interface; wherein the command transforming system determines a first sequence rule of the first device and a second sequence rule of a second device, wherein the first sequence rule means if the first device is required to process the command in sequence and the second sequence rule means if the second device is required to process the command in sequence; wherein the second transceiving interface receives a response, wherein the second device processes the command to generate the response according to the second sequence rule; wherein the first transceiving interface transmits the response to the first device according to the first sequence rule.

In view of above-mentioned embodiments, commands can be smoothly received and executed under the condition that the command execution sequence requirements of different transceiving interfaces are met, and devices that follow different standards can be smoothly connected and operate.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

Figure 1:
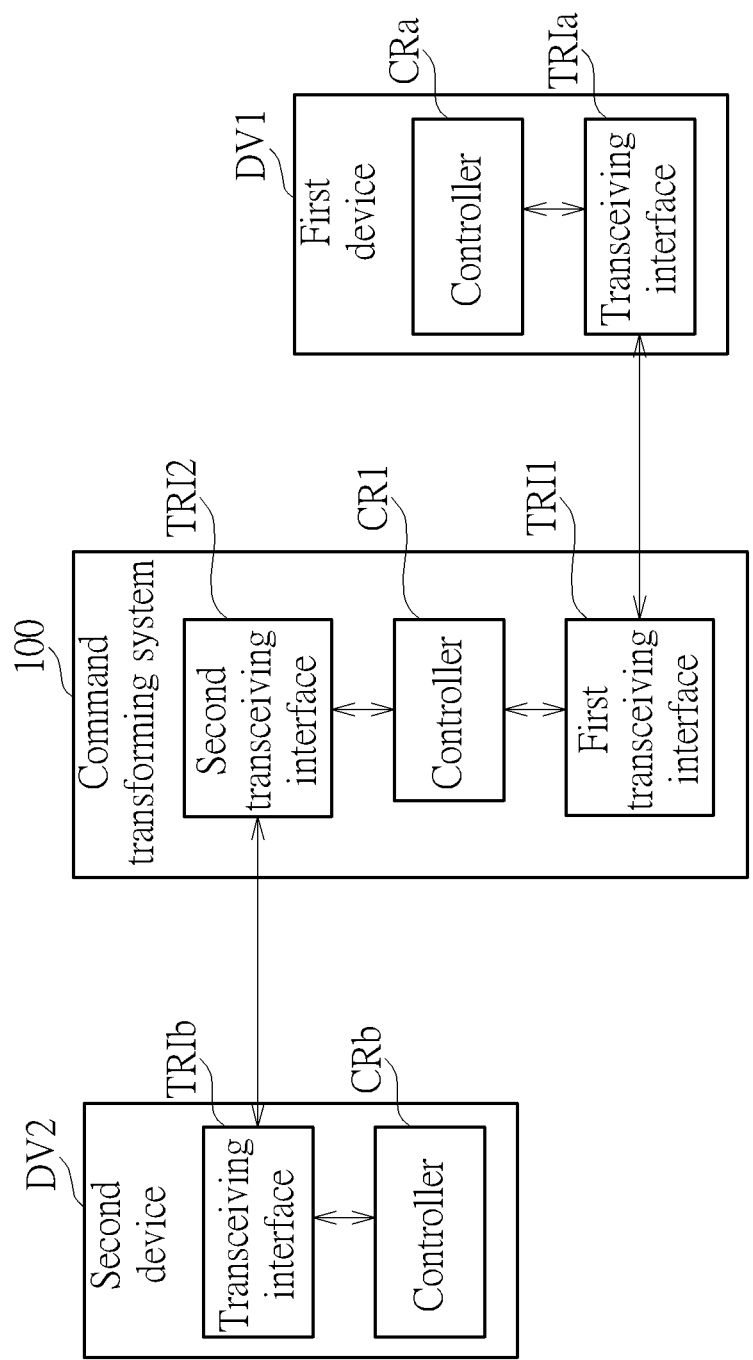
FIG. 1 is a block diagram illustrating a command transforming system according to one embodiment of the present invention.

FIG. 1 is a block diagram illustrating a command transforming system according to one embodiment of the present invention. As shown in FIG. 1, the command transforming system 100 comprises a first transceiving interface TRI1, a second transceiving interface TRI2, and a controller CR1. The first transceiving interface TRI1 is configured to receive a command from the first device DV1 and transmit it to the second transceiving interface TRI2. The second transceiving interface TRI2 is configured to transmit the received command to the second device DV2, and to receive the response from the second device DV2 and transmit the response to the first transceiving interface TRI1. The first transceiving interface TRI1 transmits the response to the first device DV1. The first transceiving interface TRI1 can be regarded as a direct interface, and the second transceiving interface TRI2 can be regarded as a non-direct interface. The first device DV1 and the second device DV2 may comprise controllers CRa and CRb, respectively, and may also comprise transceiving interfaces TRIa and TRIb, respectively.

The command transforming system 100 determines a first sequence rule of the first device DV1 and a second sequence rule of the second device DV2. The first sequence rule means the first device DV1 is required to process the command in sequence, and the second sequence rule means the second device DV2 is required to process the command in sequence. The second device DV2 processes the command according to the second sequence rule and transmits a response corresponding to the command to the second transceiving interface TRI2. The first transceiving interface TRI1 transmits a response to the first device DV1 according to the first sequence rule. This determination step can be determined by any component in the command transforming system 100. For example, it can be determined by the controller CR1 or the first transceiving interface TRI1. The first sequence rule and the second sequence rule may be determined by the types of the first device DV1 and the second device DV2, and the standard that the first device DV1 and the second device DV2 follow. In addition, the first sequence rule and the second sequence rule can also be forcibly set by the command transforming system 100.

Figure 2:
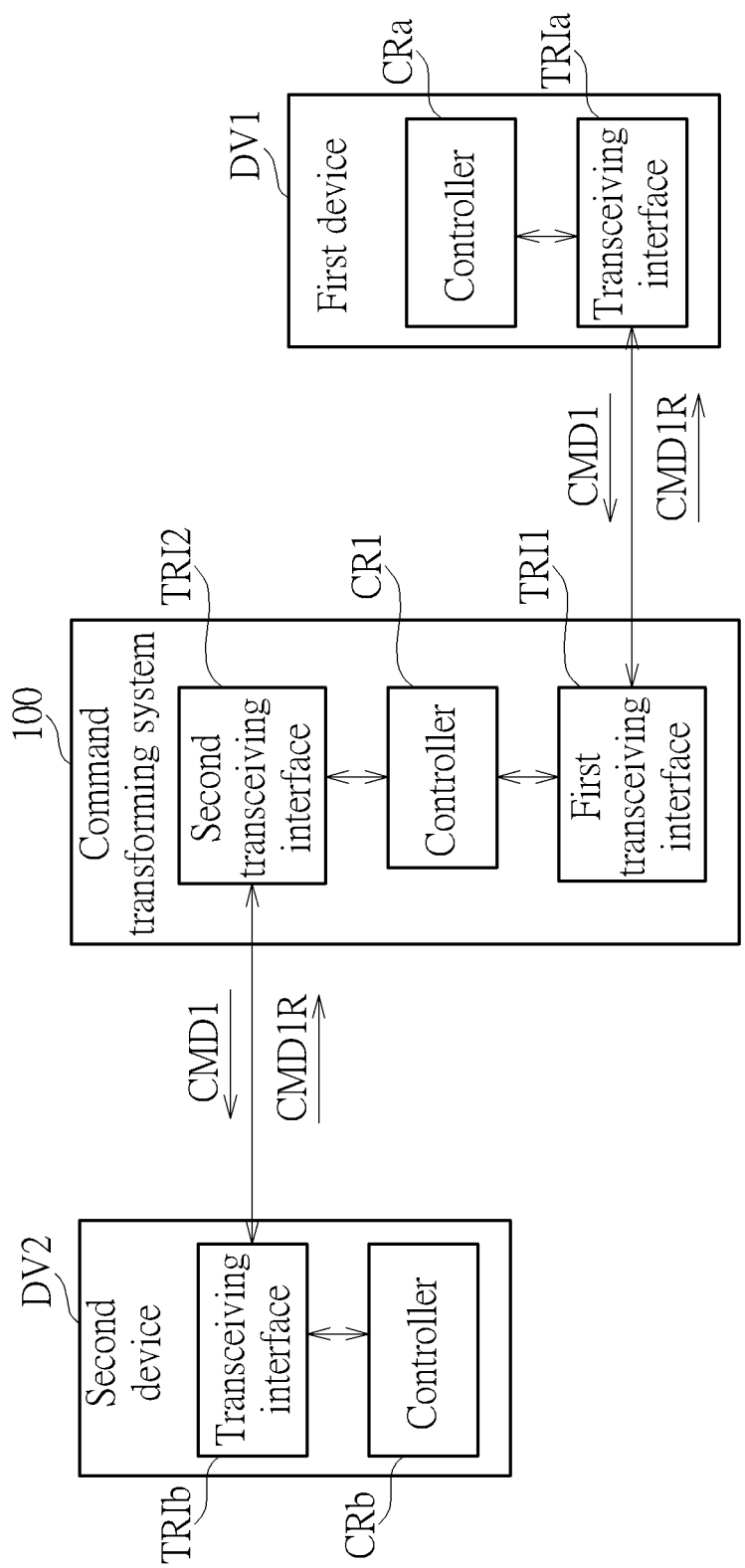
FIG. 2-FIG. 4 are schematic diagrams illustrating operations of the command transforming system in FIG. 1, according to different embodiments of the present invention.
Figure 3:
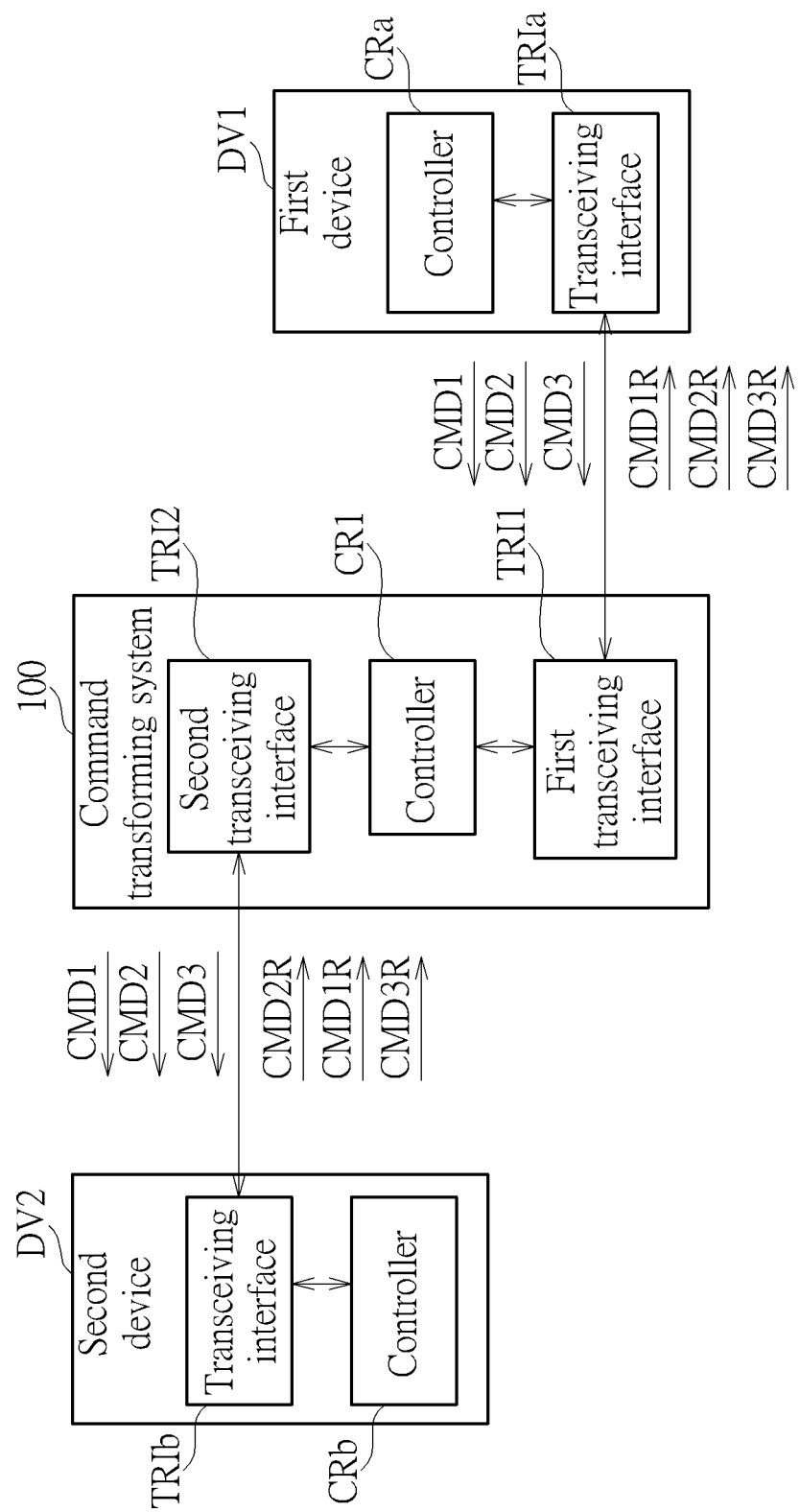
Figure 4:
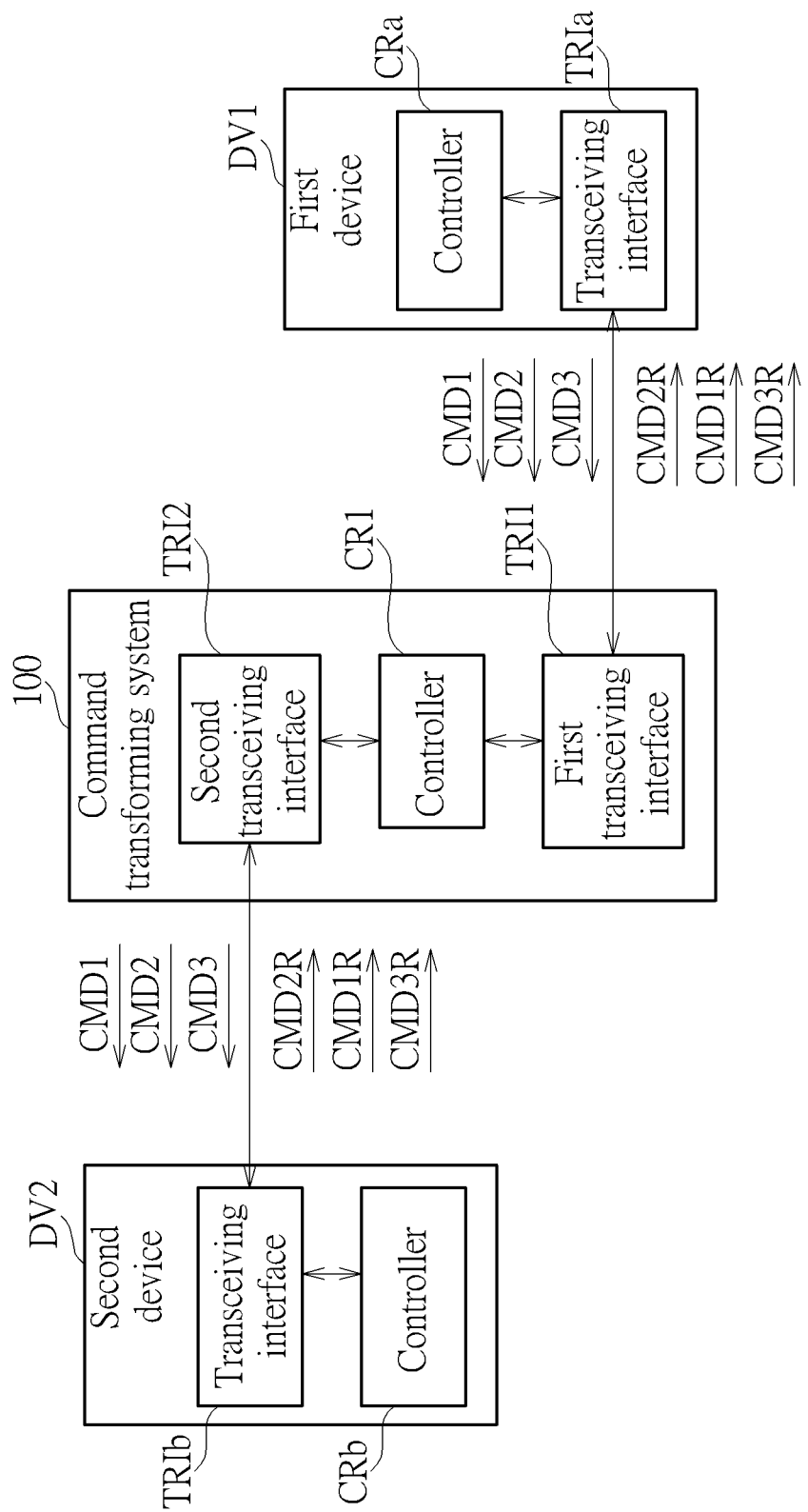

FIG. 2-FIG. 4 are schematic diagrams illustrating operations of the command transforming system in FIG. 1, according to different embodiments of the present invention. In detail, FIG. 2-FIG. 4 are schematic diagrams illustrating the operations of the command transforming system shown in FIG. 1 when the first sequence rule and the second sequence rule are in different states.

In the embodiment of FIG. 2, the first sequence rule means that the first device DV1 is required to process the command in sequence, and the second sequence rule means that the second device DV2 is required to process the command in sequence. In such case, the first transceiving interface TRU receives a command CMD1 transmitted by the first device DV1, and transmits the command CMD1 to the second transceiving interface TRI2. However, after the command CMD1 is transmitted to the second device DV2 via the second transceiving interface TRI2, the first transceiving interface TRI1 does not receive any other command from the command CMD1 from the first device DV1 until the first device DV1 receives the response CMD1R corresponding to the command CMD1. Specifically, after the command CMD1 is transmitted to the second device DV2 via the second transceiving interface TRI2, if the response CMD1R corresponding to the command CMD1 is not received via the second transceiving interface TRI2 and the response CMD1R corresponding to the command CMD1 is not transmitted via the first transceiving interface DV1 to the first device DV1, any other command from the first device DV1 is not received via the first transceiving interface TRI1.

In another embodiment, the first sequence rule still means that the first device DV1 is required to process the command in sequence, and the second sequence rule still means that the second device DV2 is required to process the command in sequence. However, this embodiment is not limited to that the first transceiving interface TRI1 does not receive any other command from the command CMD1 from the first device DV1 until the first device DV1 receives the response CMD1R corresponding to the command CMD1. In this example, the first transceiving interface TRU receives a plurality of commands transmitted by the first device DV1 by a first sequence, and the second transceiving interface TRI2 also transmits the commands to the second device DV2 by the first sequence. The second device DV2 processes the commands by the first sequence and transmits responses corresponding to the commands to the second transceiving interface TRI2, and the first transceiving interface TRI1 transmits the responses to the first device DV1 by the first sequence. For example, the first device DV1 sequentially transmits three commands CMD1, CMD2, CMD3 (CMD2, CMD3 are not shown in FIG. 1) to the first transceiving interface TRI1, and then the second transceiving interface TRI2 also transmits three commands CMD1, CMD2, CMD3 to the second device DV2 in sequence. After the second device DV2 processes the commands CMD1, CMD2 and CMD3 in sequence and generates corresponding responses CMD1R, CMD2R and CMD3R (CMD2R and CMD3R are not shown in FIG. 1), it transmits responses CMD1R, CMD2R and CMD3R to the first device DV1 in sequence via the first transceiving interface TRI1.

In another embodiment, the first sequence rule means the first device DV1 is required to process the command in sequence and the second sequence rule means the second device DV2 is not required to process the command in sequence. In such case, the first transceiving interface TRI1 receives a plurality of the commands from the first device DV1 by a first sequence, and the second transceiving interface TRI2 transmits the commands from the first transceiving interface TRI1 to the second device DV2 by the same first sequence or by a second sequence different from the first sequence. The second device DV2 processes the commands by a third sequence and transmits a plurality of the responses corresponding to the commands to the second transceiving interface TRI2, and the first transceiving interface TRI1 still transmits the responses to the first device DV1 by the first sequence. FIG. 3 shows an example of this embodiment. In the embodiment shown of FIG. 3, the first device DV1 transmits three commands CMD1, CMD2, CMD3 in sequence (the first sequence) to the first transceiving interface TRI1, and the first transceiving interface TRI1 transmits the commands CMD1, CMD2, CMD3 to the second transceiving interface TRI2. Please also note that since the second device DV2 is not required to process the commands in sequence, the first transceiving interface TRI1 can transmit the commands CMD1, CMD2, and CMD3 to the second transceiving interface TRI2 by any sequence. In the embodiment shown in FIG. 2, the first transceiving interface TRI1 transmits commands to the second transceiving interface TRI2 by the sequence of commands CMD1, CMD2, and CMD3 (i.e., the first sequence).

The second transceiving interface TRI2 can transmit three commands CMD1, CMD2, CMD3 to the second device DV2 by the first sequence. However, the second transceiving interface TRI2 may also transmit the commands CMD1, CMD2, and CMD3 to the second device DV2 by another sequence (the second sequence). The second device DV2 processes the commands CMD1, CMD2, and CMD3 by another sequence (the third sequence), and then transmits the corresponding responses to the second transceiving interface TRI2 by the another sequence. In the embodiment of FIG. 3, the second device DV2 processes the commands in the sequence of commands CMD2, CMD1, and CMD3, and transmits the corresponding responses CMD2RR, CMD1R, CMD3R to the second receiving interface TRI2 in sequence.

Also, the second transceiving interface TRI2 transmits the responses CMD2RR, CMD1R and CMD3R to the first transceiving interface TRI1 by the same sequence. The first transceiving interface TRI1 transmits the responses CMD1R, CMD2R and CMD3R to the first device DV1 in sequence, that is, by the first sequence. In such case, the response received first, which is not the response CMD1R (for example, response CMD2R or CMD3R), is temporarily stored in the command transforming system 100. After the response CMD1R is received, the responses CMD1R, CMD2R and CMD3R are transmitted to the first device DV1 in sequence.

In one embodiment, the next command may be transmitted while the previous command is still being processed, but is not limited. For example, in FIG. 3, after the first device DV1 transmits the command CMD1 to the second device DV2 via the first transceiving interface TRI1 and the second transceiving interface TRI2, the command transforming system 100 may notify the first device DV1 to continue to transmit the next command CMD2 while the second device DV2 is processing the command CMD1. In the embodiment of FIG. 3, if the first device DV1 only transmits one command, the operations of the first device DV1, the second device DV2 and the command transforming system 100 are the same as the embodiment shown in FIG. 2.

In another embodiment, the first sequence rule means that the first device DV1 is not required to process the commands in sequence, and the second sequence rule means that the second device DV2 is not required to process the commands in sequence. In such case, the first transceiving interface TRI1 receives a plurality of the commands from the first device DV1 by a first sequence, and the second transceiving interface TRI2 transmits the commands from the first transceiving interface TRU to the second device DV2 by the first sequence or by a second sequence different from the first sequence. The second device DV2 processes the commands by a third sequence and transmits a plurality of the responses corresponding to the commands to the second transceiving interface TRI2, and the first transceiving interface TRI1 transmits the responses to the first device DV1 by the third sequence or a fourth sequence. FIG. 4 shows an example of this embodiment. In the embodiment shown in FIG. 4, the first device DV1 transmits three commands CMD1, CMD2, CMD3 in sequence (i.e., the first sequence) to the first transceiving interface TRI1, and the first transceiving interface TRU transmits the commands CMD1, CMD2 and CMD3 to the second transceiving interface TRI2. Please note that since the second device DV2 is not required to process the commands in sequence, the first transceiving interface TRU can transmit the commands CMD1, CMD2, and CMD3 to the second transceiving interface TRI2 by any sequence. In the embodiment shown in FIG. 4, the first transceiving interface TRI1 transmits commands to the second transceiving interface TRI2 by the sequence of commands CMD1, CMD2, and CMD3 (i.e., the first sequence).

The second transceiving interface TRI2 can transmit three commands CMD1, CMD2, CMD3 to the second device DV2 by the first sequence. However, the second transceiving interface TRI2 may also transmit the commands CMD1, CMD2, and CMD3 to the second device DV2 by another sequence (a second sequence). Then, after the second device DV2 processes CMD1, CMD2, and CMD3 in another sequence (the third sequence), it transmits a corresponding response to the second transceiving interface TRI2 by this sequence. In the embodiment shown in FIG. 4, the second device DV2 processes the commands by the sequence of commands CMD2, CMD1 and CMD3 and transmits corresponding responses CMD2RR, CMD1R and CMD3R to the second receiving interface TRI2 in sequence. Also, the second transceiving interface TRI2 transmits the responses CMD2RR, CMD1R and CMD3R to the first transceiving interface TRI1 by the same sequence. The first transceiving interface TRI1 may transmit responses CMD2RR, CMD1R and CMD3R to the first device DV1 by the third sequence, that is, by the sequence of responses CMD2RR, CMD1R and CMD3R shown in FIG. 4. However, since the first device DV1 is not required to process the commands in sequence, the first transceiving interface TRI1 can transmit responses CMD1RR, CMD2R and CMD3R to the first device DV1 by another sequence (the fourth sequence).

In one embodiment, the next command may be transmitted while the previous command is still being processed. For example, after the first device DV1 transmits the command CMD1 to the second device DV2 via the first transceiving interface TRI1 and the second transceiving interface TRI2, the command transforming system 100 may notify the first device DV1 to continue to transmit the next command CMD2 while the second device DV2 is processing the command CMD1. In the embodiment of FIG. 4, if the first device DV1 only transmits one command, the operations of the first device DV1, the second device DV2 and the command transforming system 100 are the same as the embodiment shown in FIG. 2.

In view of the above embodiments, if the first sequence rule means that the first device DV1 is required to process the commands in sequence, the sequence by which the first device DV1 transmits the commands must be the same as the sequence by which the first device DV1 receives the corresponding responses. For example, if the first device DV1 transmits the commands CMD1, CMD2, and CMD3 in sequence, the sequence by which the first device DV1 receives the corresponding responses must be the sequence of responses CMD1R, CMD2R, and CMD3R shown in FIG. 3. Oppositely, if the first sequence rule means that the first device DV1 is not required to process the commands in sequence, the sequence by which the first device DV1 transmits the commands can be different from the sequence by which the first device DV1 receives the corresponding responses. As shown in FIG. 4, if the first device DV1 transmits the commands CMD1, CMD2, and CMD3 in sequence, the sequence by which the first device DV1 receives the corresponding responses may be the sequence of the responses CMD2R, CMD1R, and CMD3R.

If the second sequence rule means that the second device DV2 is required to process the commands in sequence, the sequence by which the second device DV2 receives the commands must be the same as the sequence by which the second device DV2 processes the commands and generates corresponding responses. For example, if the second device DV2 receives the commands CMD1, CMD2, and CMD3 in sequence, the second device DV2 must process the commands by the sequence of the commands CMD1, CMD2, and CMD3 and generate responses CMD1R, CMD2R, and CMD3R. Conversely, if the second sequence rule means that the second device DV2 is not required to process the commands in sequence, the sequence by which the second device DV2 receives the commands and the sequence by which the second device DV2 processes the commands and generates corresponding responses may be different. As shown in FIGS. 3 and 4, if the second device DV2 receives the commands CMD1, CMD2, and CMD3 in sequence, the second device DV2 can process the commands CMD2, CMD1, and CMD3 in sequence and generate corresponding responses CMD2R, CMD1R, CMD3R.

Please also note, in the above-mentioned embodiments, only one indirect interface (the second transceiving interface TIR2) and an electronic device (the second electronic device DV2) connected to the indirect interface are comprised. However, the present invention may also comprise a plurality of indirect interfaces and a plurality of electronic devices connected to the indirect interfaces. For example, the command transforming system 100 may further comprise a third transceiving interface, which is also an indirect interface. The third transceiving interface is connected to a third device. The second transceiving interface and the third transceiving interface may be transceiving interfaces using the same standard or may be transceiving interfaces using different standards. The command transforming system 100 can follow the aforementioned rules, that is, determine whether the first device DV1 and the third electronic device DV3 are required to process commands in sequence, and then control the operations of the first transceiving interface TRI1 and the third transceiving interface TRI3 accordingly.

The aforementioned first device DV1 and second device DV2 may be various types of electronic devices. In one embodiment, the first transceiving interface TRI1 is a USB interface and the second transceiving interface TRI2 is a PCIE interface. The first device DV1 is a USB device, for example, a USB device in a computer host. The first device DV1 may also be a USB device including a controller and a USB interface. The second device DV2 is a device using a PCIE interface, such as an SSD (Solid-state drive, or Solid-state disk). The first device DV1 communicates with the command transforming system 100 through UASP (USB Attached SCSI Protocol), while the second device DV2 communicates with the command transforming system 100 through NVMe (Non-Volatile Memory Express). Operations when the first transceiving interface TRI1 is a USB interface and the second transceiving interface TRI2 is a PCIE interface in the embodiments shown in FIGS. 2, 3 and 4 are described as below.

In the embodiment of FIG. 2, when the first device DV1 wants to transmit a SCSI (Small Computer System Interface) command to the second device DV2, it packages the SCSI command into a USB command through UASP, and then transmits the USB command to the first transceiving interface TRI1. The command transforming system 100 first determines whether the first device DV1 and the second device DV1 are required to process commands in sequence. In the embodiment of FIG. 2, since both the first device DV1 and the second device DV1 are required to process the commands in sequence, the command transforming system 100 transmits the commands to the second device DV2 through the second transceiving interface TRI2 for processing, and waits for the second device DV2 to process and then response to the first device DV1. If the first device DV1 generates another command before the second device DV2 has finished processing the command, the command transforming system 100 can inform the first device DV1 that the previous command has not been processed through a packet (e.g., Nrdy) following the USB standard.

In the embodiment of FIG. 3, when the first device DV1 wants to transmit a SCSI command to the second device DV2, the SCSI command is packaged into a USB command through UASP, and then transmitted to the first transceiving interface TRI1. The command transforming system 100 first determines whether the first device DV1 and the second device DV1 are required to process commands in sequence. In the embodiment of FIG. 3, since only the first device DV1 is required to process the commands in sequence and the second device DV2 is not, the command transforming system 100 transmits the commands to the second device DV2 for processing through the second transceiving interface TRI2, and informs the first device DV1 that it can continue to transmit commands through a control packet (e.g., Erdy) following the USB standard. Then, regardless of the sequence by which the second device DV2 processes the commands and transmits the responses, the command transforming system 100 ensures that the first transceiving interface TRI1 transmits the responses to the first device DV1 by the sequence by which the first device DV1 transmits the commands.

In the embodiment of FIG. 4, when the first device DV1 wants to transmit a SCSI command to the second device DV2, the SCSI command is packaged into a USB command through UASP, and then sent to the first transceiving interface TRI1. The command transforming system 100 first determines whether the first device DV1 and the second device DV1 are required to process commands in sequence. In the embodiment of FIG. 4, neither the first device DV1 nor the second device DV2 is required to process the commands in sequence, so the command transforming system 100 transmits the commands to the second device DV2 through the second transmission interface TRI2 for processing, and informs the first device DV1 by a control packet (e.g., Erdy) following the USB standard that it can continue to transmit commands. Then, the first transceiving interface TRI1 transmits the responses to the first device DV1 by the sequence by which the second device DV2 generates the responses.

Figure 5:
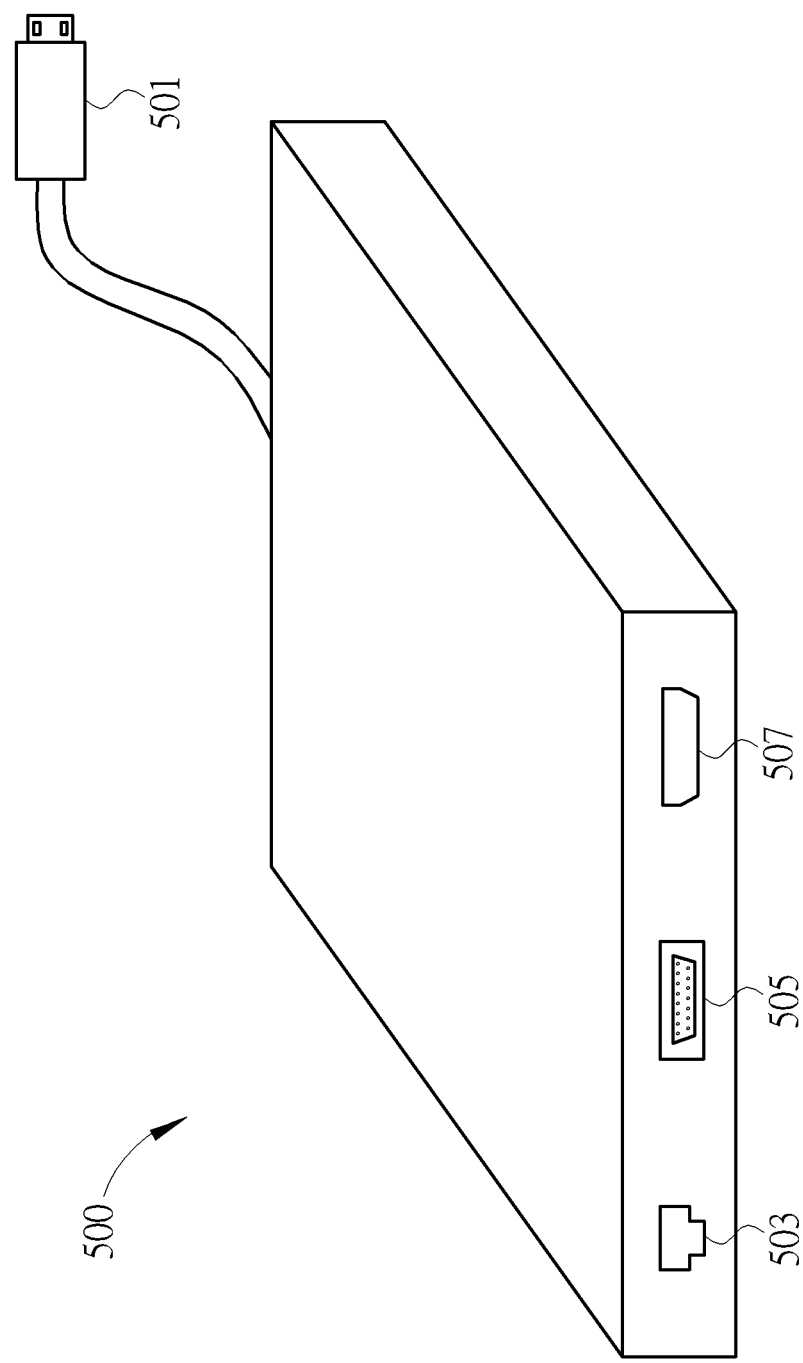
FIG. 5 is a practical example of the command transforming system provided by the present invention.

FIG. 5 is a practical example of the command transforming system provided by the present invention. However, please note that the command transforming system provided by the present invention is not limited to be implemented by the command transforming device shown in FIG. 5. As shown in FIG. 5, the command transforming device 500 comprises a connector 501 and output ports 503, 505 and 507. The connector 501 is a part of the direct interface (the aforementioned first transceiving interface TRI1) comprised in the command transforming device 500. The output ports 503, 505, and 507 are parts of the indirect interface (the aforementioned second transceiving interface TRI2) which follow different standards. The command transforming device 500 can be connected to the aforementioned first device DV1 (e.g., the first device DV1 in a computer host) through the connector 501, and then the output ports 503, 505, and 507 can be respectively used to connect peripheral devices following different standards. Via such structure, the user can control the peripheral devices connected to the output ports 503, 505 and 507 through the host computer, and uses the command transforming device 500 to transform the commands.

Figure 6:
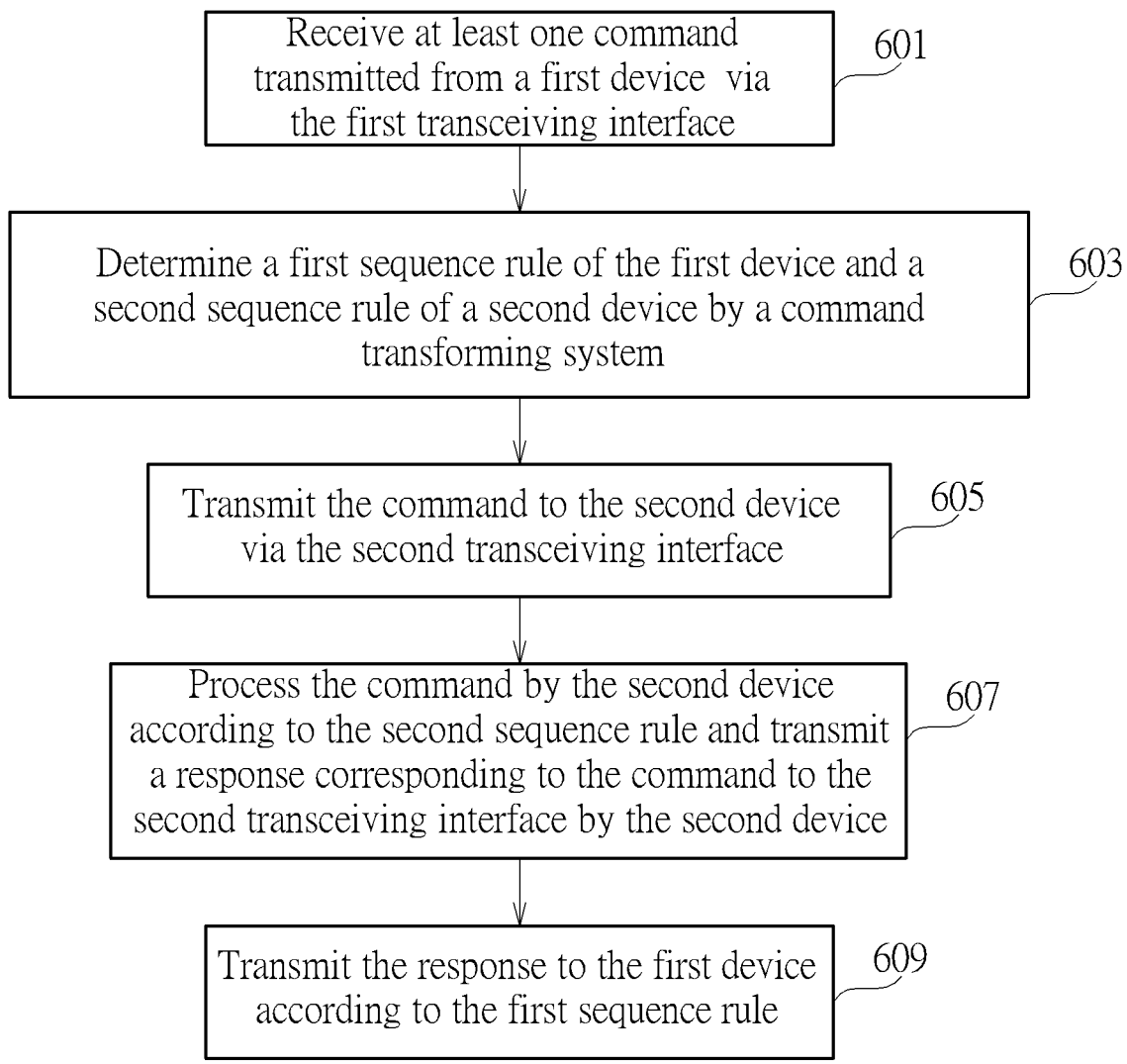
FIG. 6 is a flow chart illustrating a command transforming method according to one embodiment of the present invention.

FIG. 6 is a flow chart illustrating a command transforming method according to one embodiment of the present invention, used in a command transforming system comprising a first transceiving interface and a second transceiving interface. The command transforming method comprises following steps:

Step 601

Receive at least one command transmitted from a first device (e.g., the first device DV1 in FIG. 1) via the first transceiving interface (e.g., the first transceiving interface TRI1 in FIG. 1).

Step 603

Determine a first sequence rule of the first device and a second sequence rule of a second device (e.g., the second device DV2 of FIG. 1) by a command transforming system (e.g., the command transforming system 100 of FIG. 1). The first sequence rule means the first device is required to process the command in sequence and the second sequence rule means the second device is required to process the command in sequence.

Step 605

Transmit the command to the second device DV2 via the second transceiving interface (e.g., the second transceiving interface TRI2 in FIG. 2).

Step 607

Process the command by the second device according to the second sequence rule and transmit a response corresponding to the command to the second transceiving interface by the second device.

Step 609

Transmit the response to the first device according to the first sequence rule.

Other detailed steps have been disclosed in the above-mentioned embodiments, thus are omitted for brevity here.

In view of above-mentioned embodiments, commands can be smoothly received and executed under the condition that the command execution sequence requirements of different transceiving interfaces are met, and devices that follow different standards can be smoothly connected and operate.

Those skilled in the art will readily observe that numerous modifications and alterations of the device and method may be made while retaining the teachings of the invention. Accordingly, the above disclosure is required to be construed as limited only by the metes and bounds of the appended claims.

What is claimed is:

1. A command transforming method, applied to a command transforming system comprising a first transceiving interface and a second transceiving interface, first transceiving interface and the second the transceiving interface following different standards, the command transforming method comprising:
    receiving at least one command transmitted from a first device via the first transceiving interface;
    determining a first sequence rule of the first device and a second sequence rule of a second device;
    transmitting the command to the second device via the second transceiving interface;
    processing the command by the second device according to the second sequence rule and transmitting a response corresponding to the command to the second transceiving interface by the second device; and
    transmitting the response to the first device according to the first sequence rule;
    wherein the first sequence rule means whether the first device is required to receive responses of a plurality of commands generated by the first device following a sequence by which the first device output the commands to the first transceiving interface;
    wherein the second sequence rule means whether the second device is required to process the commands following the sequence by which the first device output the commands to the first transceiving interface.

2. The command transforming method of claim 1,
    wherein the first sequence rule means the first device is required to receive responses of a plurality of commands generated by the first device following the sequence by which the first device output the commands to the first transceiving interface;
    wherein the second sequence rule means the second device is required to process the commands following the sequence by which the first device output the commands to the first transceiving interface;
    wherein the first transceiving interface receives a plurality of the commands from the first device by a first sequence, and the second transceiving interface transmits the commands to the second device by the first sequence;
    wherein the second device processes the commands and transmits a plurality of the responses corresponding to the commands to the second transceiving interface by the first sequence, and the first transceiving interface transmits the responses to the first device by the first sequence.

3. The command transforming method of claim 1,
    wherein the first sequence rule means the first device is required to receive responses of a plurality of commands generated by the first device following the sequence by which the first device output the commands to the first transceiving interface;
    wherein the second sequence rule means the second device is required to process the commands following the sequence by which the first device output the commands to the first transceiving interface;
    wherein the first transceiving interface receives a first command from the first device;
    wherein after the second transceiving interface transmits the first command to the second device, the first transceiving interface does not receive any other command from the first device until the first device receives a response corresponding to the first command.

4. The command transforming method of claim 1,
    wherein the first sequence rule means the first device is required to receive responses of a plurality of commands generated by the first device following the sequence by which the first device output the commands to the first transceiving interface;
    wherein the second sequence rule means the second device is not required to process the commands following the sequence by which the first device output the commands to the first transceiving interface;
    wherein the first transceiving interface receives a plurality of the commands from the first device by a first sequence, and the second transceiving interface transmits the commands to the second device by the first sequence or by a second sequence;
    wherein the second device processes the commands by a third sequence and transmits a plurality of the responses corresponding to the commands to the second transceiving interface, and the first transceiving interface still transmits the responses to the first device by the first sequence.

5. The command transforming method of claim 1,
    wherein the first sequence rule means the first device is not required to receive responses of a plurality of commands generated by the first device following the sequence by which the first device output the commands to the first transceiving interface;
    wherein the second sequence rule means the second device is not required to process the commands following the sequence by which the first device output the commands to the first transceiving interface;
    wherein the first transceiving interface receives a plurality of the commands from the first device by a first sequence, and the second transceiving interface transmits the commands to the second device by the first sequence or by a second sequence;

wherein the second device processes the commands by a third sequence and transmits a plurality of the responses corresponding to the commands to the second transceiving interface, and the first transceiving interface transmits the responses to the first device by the third sequence or a fourth sequence.

6. The command transforming method of claim 1, wherein the command transforming system further comprises a controller, wherein the command transforming method further comprises:

determining the first sequence rule and the second sequence rule by the controller or by the first transceiving interface.

7. The command transforming method of claim 1, wherein the first sequence rule and the second sequence rule are respectively decided according to types of the first device and the second device.

8. The command transforming method of claim 1, wherein the first sequence rule and the second sequence rule are respectively decided according to standards which the first device and the second device follow.

9. The command transforming method of claim 1, wherein the command transforming system informs one of the first device and the second device to transmit a next command when a previous command is still processed by other one of the first device and the second device.

10. A command transforming device, comprising:
a first transceiving interface, configured to receive at least one command transmitted from a first device;
a second transceiving interface, configured to transmit the command to the second device, wherein the first transceiving interface and the second transceiving interface follow different standards; and
a controller, configured to control the first transceiving interface and the second transceiving interface;
wherein the command transforming system determines a first sequence rule of the first device and a second sequence rule of a second device;
wherein the second transceiving interface receives a response, wherein the second device processes the command to generate the response according to the second sequence rule;
wherein the first transceiving interface transmits the response to the first device according to the first sequence rule;
wherein the first sequence rule means whether the first device is required to receive responses of a plurality of commands generated by the first device following a sequence by which the first device output the commands to the first transceiving interface;
wherein the second sequence rule means whether the second device is required to process the commands following the sequence by which the first device output the commands to the first transceiving interface.

11. The command transforming device of claim 10,
wherein the first sequence rule means the first device is required to receive responses of a plurality of commands generated by the first device following the sequence by which the first device output the commands to the first transceiving interface;
wherein the second sequence rule means the second device is required to process the commands following the sequence by which the first device output the commands to the first transceiving interface;
wherein the first transceiving interface receives a plurality of the commands from the first device by a first sequence, and the second transceiving interface transmits the commands to the second device by the first sequence;
wherein the second device processes the commands and transmits a plurality of the responses corresponding to the commands to the second transceiving interface by the first sequence, and the first transceiving interface transmits the responses to the first device by the first sequence.

12. The command transforming device of claim 10,
wherein the first sequence rule means the first device is required to receive responses of a plurality of commands generated by the first device following the sequence by which the first device output the commands to the first transceiving interface;
wherein the second sequence rule means the second device is required to process the commands following the sequence by which the first device output the commands to the first transceiving interface;
wherein the first transceiving interface receives a first command from the first device;
wherein after the second transceiving interface transmits the first command to the second device, the first transceiving interface does not receive any other command from the first device until the first device receives a response corresponding to the first command.

13. The command transforming device of claim 10,
wherein the first sequence rule means the first device is required to receive responses of a plurality of commands generated by the first device following the sequence by which the first device output the commands to the first transceiving interface;
wherein the second sequence rule means the second device is not required to process the commands following the sequence by which the first device output the commands to the first transceiving interface;
wherein the first transceiving interface receives a plurality of the commands from the first device by a first sequence, and the second transceiving interface transmits the commands to the second device by the first sequence or by a second sequence;
wherein the second device processes the commands by a third sequence and transmits a plurality of the responses corresponding to the commands to the second transceiving interface, and the first transceiving interface still transmits the responses to the first device by the first sequence.

14. The command transforming device of claim 10,
wherein the first sequence rule means the first device is not required to receive responses of a plurality of commands generated by the first device following the sequence by which the first device output the commands to the first transceiving interface;
wherein the second sequence rule means the second device is not required to process the commands following the sequence by which the first device output the commands to the first transceiving interface;
wherein the first transceiving interface receives a plurality of the commands from the first device by a first sequence, and the second transceiving interface transmits the commands to the second device by the first sequence or by a second sequence;
wherein the second device processes the commands by a third sequence and transmits a plurality of the responses corresponding to the commands to the second transceiving interface, and the first transceiving interface transmits the responses to the first device by the third sequence or a fourth sequence.

15. The command transforming device of claim 10, wherein the command transforming device determines the first sequence rule and the second sequence rule by the controller or by the first transceiving interface.

16. The command transforming device of claim 10, wherein the first sequence rule and the second sequence rule are respectively decided according to types of the first device and the second device.

17. The command transforming device of claim 10, wherein the first sequence rule and the second sequence rule are respectively decided according to standards which the first device and the second device follow.

18. The command transforming device of claim 10, wherein the command transforming device informs one of the first device and the second device to transmit a next command when a previous command is still processed by other one of the first device and the second device.

* * * * *